United States Patent Office 3,543,548
Patented Dec. 1, 1970

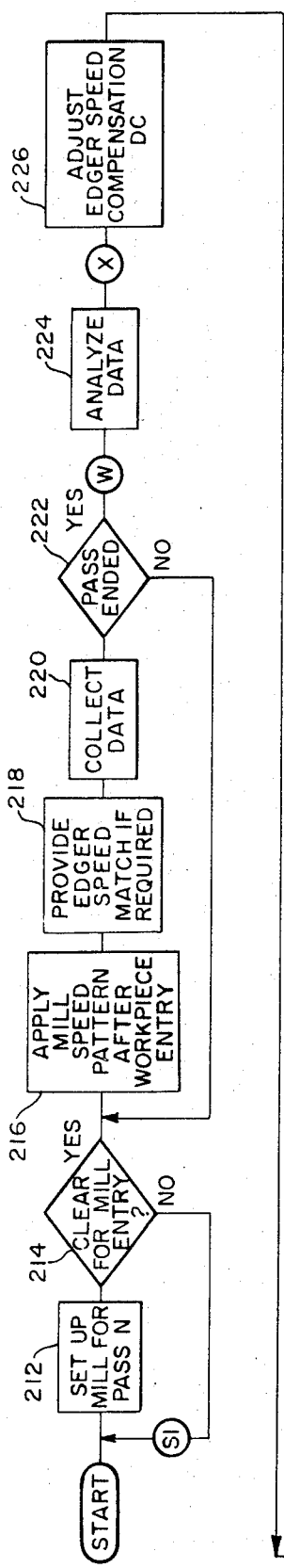
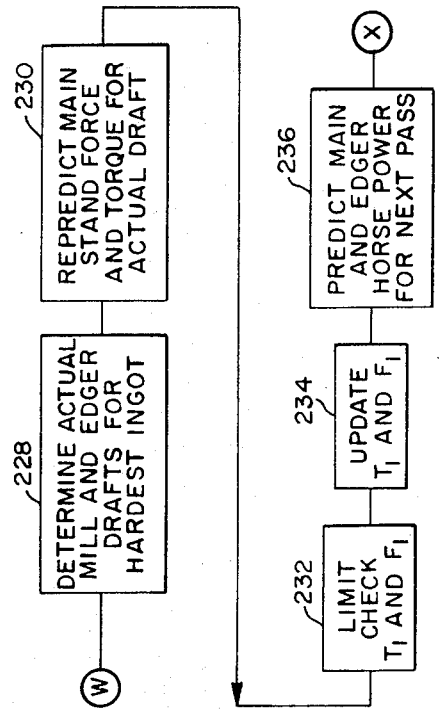
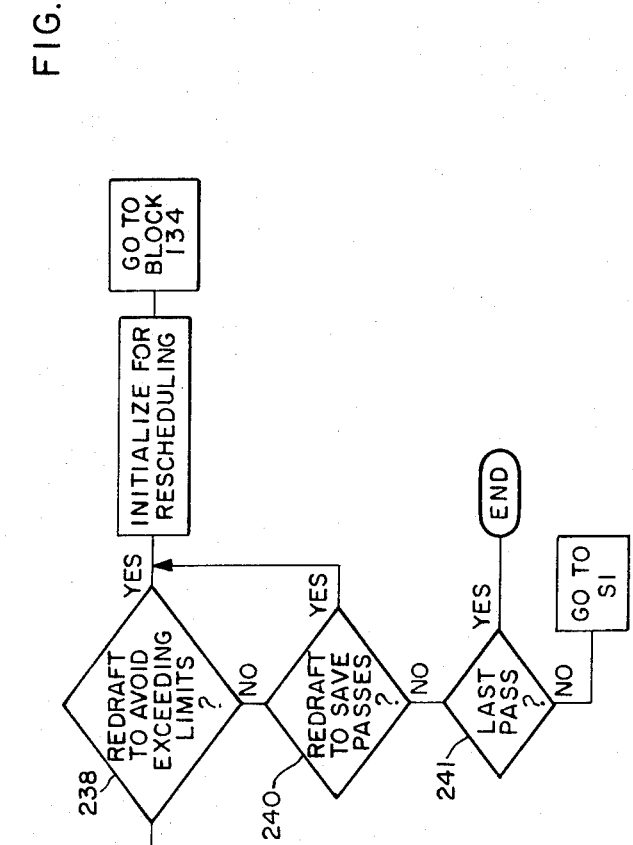
FIG. 6
FIG. 6A

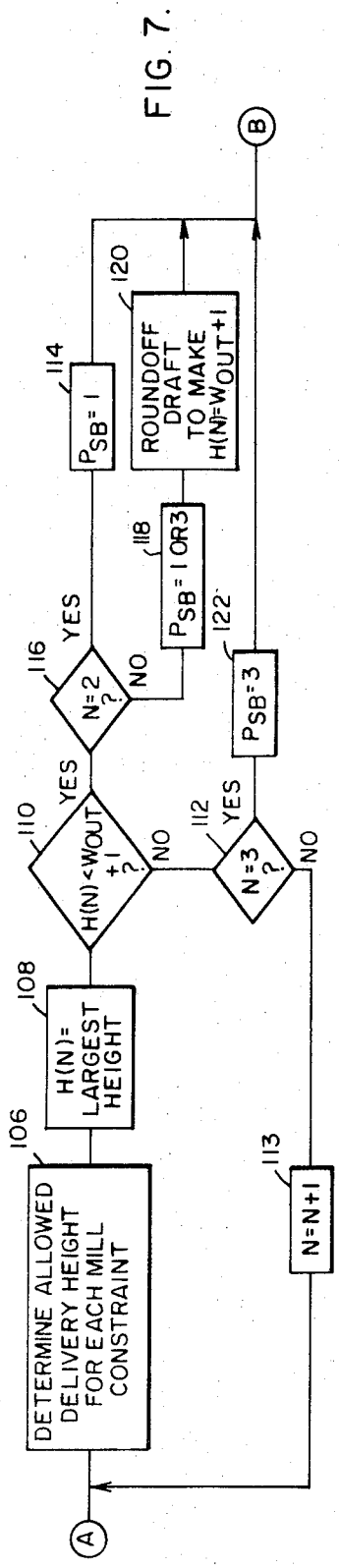
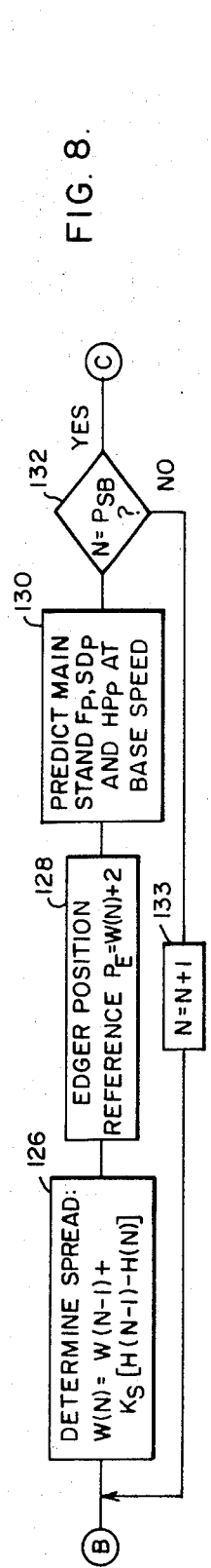
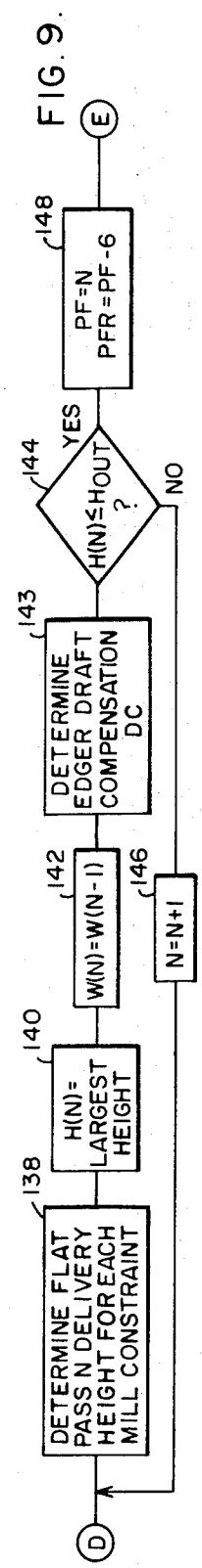
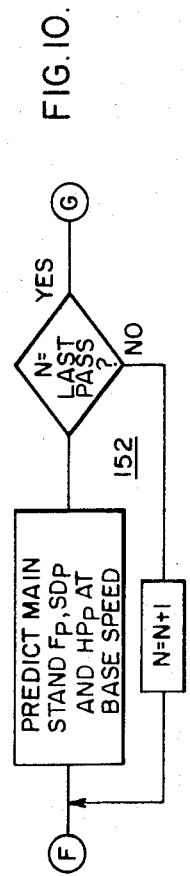

3,543,548
METHOD AND COMPUTER CONTROL SYSTEM FOR OPERATING A SLABBING MILL
Andrew W. Smith, Jr., Pittsburgh, Pa., assignor to Westinghouse Electric Corporation, Pittsburgh, Pa., a corporation of Pennsylvania
Filed Aug. 27, 1968, Ser. No. 755,633
Int. Cl. B21b 37/14
U.S. Cl. 72—7    28 Claims

ABSTRACT OF THE DISCLOSURE

A digital computer system determines the mill schedule including the main mill stand and edger stand setup and operating conditions required to reduce an entry ingot to a slab product of specified width and thickness within operating constraints. Updating data is processed by the computer to modify the schedule for minimum processing time on the basis of the actual workpiece hardness.

BACKGROUND OF THE INVENTION

The present invention relates to metal workpiece reduction mills and more particularly to control systems for slabbing mills used for reducing steel ingots to steel slabs or blooms.

The universal mill is one basic type of slabbing mill in which ingot thickness is reduced during flat rolling passes by horizontal rolls of a main reversing stand and ingot width is at least partly reduced during flat rolling passes by separate vertical edger stand rolls located on one side of the main stand. In this type of mill, the ingot is typically placed on edge for scale breaking and partial width reduction during one or more rolling passes through the main rolls prior to the described flat rolling passes. Under some circumstances, different sequential combinations of flat and edge passes may be employed.

Normally, only one main stand and only one edger stand are used in a universal steel slabbing mill. Motor driven entry and delivery roller tables are usually employed for driving an in process workpiece to and from the work rolls. Manipulator sideguards provide workpiece guidance and manipulator fingers are employed in conjunction with the sideguards to turn the workpiece between flat and edge positions as required.

Another basic kind of slabbign mill is the high lift type in which a single reversing stand is provided with horizontal rolls used to produce all of the required workpiece thickness and width reduction. Typically, an ingot might be flat rolled until it is reduced to a first thickness such as 16 inches and it is then turned on edge and directed through a 16 inch groove in the work rolls for width reduction. Thereafter, the workpiece is flat rolled to a second thickness such as 10 inches and then turned on edge for width reduction in a 10 inch groove in the work rolls, and so forth. In the high lift mill, scheduling and control of workpiece reduction is restricted by the work roll design but its use is sometimes preferred over universal slabbing mill use particularly for certain types of steel. Previous control systems directed to efficient high lift slabbing mill operation include programmed predictive scheduling computer systems such as the one described in a paper entitled "Combination Slab and Plate Mill Under Computer Control," presented by D. R. Jones and A. W. Smith, Jr. and published in the May 1965 issue of Iron and Steel Engineer.

Continuous casting is another method by which slabs and similarly shaped products can be obtained without the need of a slabbing mill. However, a significant need for improved slabbing mills continues since some alloys are difficult to work with in continuous casting operations and because slabbing mills are often preferred over casting for various other reasons.

The present invention is directed to scheduling control of universal slabbing mills and adaptive control of universal and high lift slabbing mills in which slab or blooms or other shaped product units are rolled from ingots. By the term "slabbing mill," it is thus herein intended to refer to ingot processing mills including those used to produce slabs or blooms.

In the operations of slabbing mills, it is desirable for productivity reasons to process an entry ingot to the specified slab geometry in as little time as possible. The entry ingots might typically have one of ten to twelve different cross-section sizes, and they would vary in height in accordance with the ingot pouring operation. The distribution of thickness reduction work loading among successive flat passes must result in the specified end product thickness without exceeding mill operating constraints. Similarly, and particularly in universal mills, the distribution of width reduction work loading among the successive edge and flat passes must result in the specified end product width without exceeding mill operating constraints and without excessive edge working. Normally, slab process time minimization is achieved when the number of passes is minimized.

Conventionally, the universal slabbing mill operator determines the ingot size and the required product size and estimates the entry ingot hardness or some characteristic or characteristics which reflect the hardness. On the basis of these factors and on the basis of general experience, the operator choose the number and types of passes to be made and the amount of reduction to be made on each pass. In the alternative, the universal slabbing mill may be equipped with a card programmed control in which case the operator initiates the operation of the control which determines by fixed rules the number and kind of passes to be made. As previously indicated, high lift slabbing mills have been operated in accordance with computer scheduling calculated before workpiece rolling.

In all of these cases, mill productivity and mill operating efficiency are limited by the accuracy of the initial estimate of the ingot hardness. If the ingot temperature or the ingot alloy is different from specifications, the actual hardness is different from the estimated hardness and a different total work loading is imposed on the mill. The operator or card or computer programmed mill sequence will involve an excess number of mill passes if the work loading actually required could have been distributed within constraints among fewer passes than the number initially specified. Further, particularly in universal mills, the card programming schedules and the operator devised schedules normally allow a conservative margin between expected mill operation and mill operating limits to meet a particular estimated ingot reduction loading because of the uncertainty involved in hardness estimation. Thus, reduced productivity and efficiency can result from an unnecessary excess in the number of passes caused by the character of the initial universal slabbing mill schedule itself.

Another difficulty involved in prior art universal slabbing mill operations is the fact that the number of edge working passes actually required to reach specified product width can become excessive because of poor edge work scheduling as related to the actual workpiece size and hardness characteristics. Excessive edge working is undesirable because it tends to cause reduced slab product quality even though it may not increase the total number of workpiece passes required. However, it can also be undesirable since unexpected additional edge work requirements can create a need for additional passes beyond that number required for flat work.

SUMMARY OF THE INVENTION

The present invention provides improved universal slabbing mill operation by improved mill scheduling and improved universal and high lift slabbing mill operation by mill operating schedule updating from feedback data as the entry ingot is worked to the specified end product. The number of passes required for ingot width and thickness reduction is initially scheduled and then updated by the feedback data to minimize the process time and limit the workpiece edge working within mill operating constraints. Preferably, the mill control system includes a digital computer system which determines and executes the main mill stand and edger mill stand setup and operating conditions for each pass. The computer system also supervises and executes auxiliary functions such as workpiece manipulation between passes and entry and delivery table coordination.

It is therefore an object of the invention to provide a novel system and method for operating a slabbing mill with improved productivity.

It is also an object of the invention to provide a novel system and method for operating a slabbing mill with improved efficiency.

It is a further object of the invention to provide a novel system and method for operating a slabbing mill with substantially minimum workpiece processing time.

An additional object of the invention is to provide a novel system and method for operating a slabbing mill under updating scheduling control directed to minimizing the number of workpiece passes.

It is another object of the invention to provide a novel system and method for operating a universal slabbing mill with better limits on workpiece edge working and consequent improvement in product quality.

It is an additional object of the invention to provide a novel system and method for operating a universal slabbing mill with the use of workpiece process scheduling closer to mill limits.

These and other objects of the invention will become more evident upon consideration of the following detailed description along with the attached drawings.

BRIEF DESCRIPTION OF THE DRAWINGS

FIGS. 5-11 show control logic flow diagrams employed in a programming system which operates the computer system of FIG. 4.

DESCRIPTION OF THE PREFERRED EMBODIMENT

Figure 1:
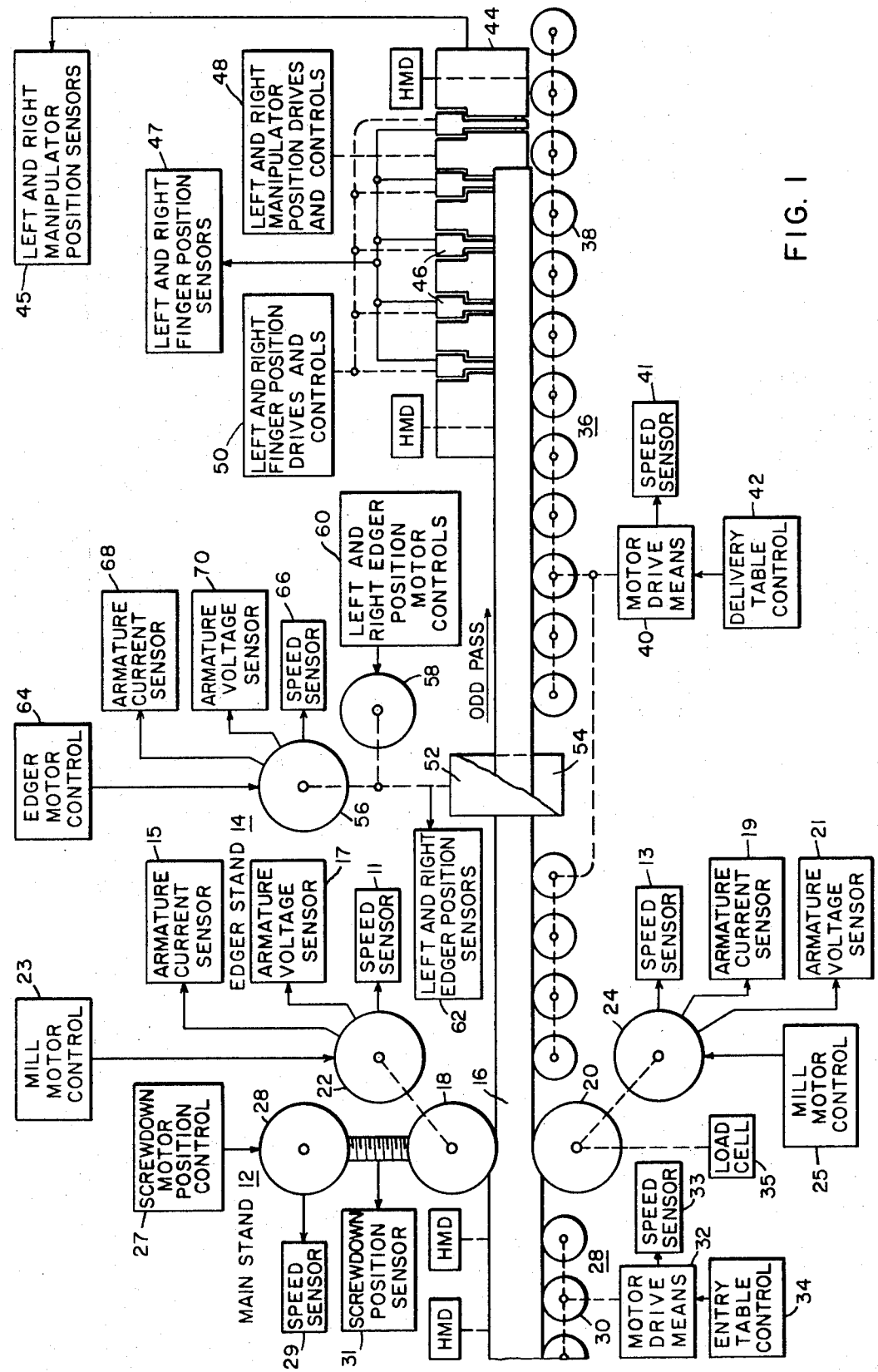
FIG. 1 shows a schematic diagram of a universal steel slabbing mill arranged and operated in accordance with the principles of the invention.

More specifically, there is shown in FIG. 1 a universal steel slabbing mill 10 having a main reversing stand 12 and an edger stand 14 through which a hot workpiece 16 is passed for reduction from ingot size to specified slab size. The main stand 12 includes a pair of conventional work rolls 18 and 20 which are driven in either the forward direction or the reverse direction by respective conventional direct current motors 22 and 24. Respective suitable electrical motor controls 23 and 25 operate the twin drives 22 and 24 under computer sequencing and speed control. Speed sensors 11 and 13 and armature current and voltage sensors 15, 17 and 19, 21 generate electrical feedback signals for programmed computer use. A predictive scheduling part of the present invention is directed to universal slabbing mills while an adaptive scheduling part of the invention is broadly applicable to both universal and high lift slabbing mills. However, specific disclosure on adaptive scheduling is herein limited to the universal slabbing mill embodiment.

Figure 2:
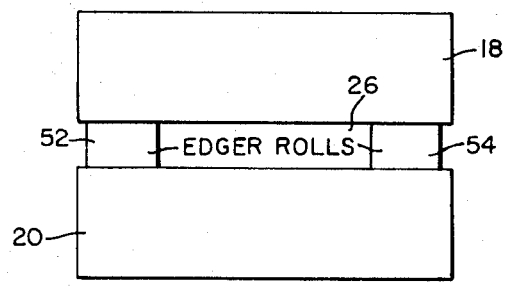
FIG. 2 illustrates by end view the relationship of vertical edger rolls and main horizontal rolls in the mill of FIG. 1.

The workpiece exit thickness after each pass through the stand 12 is determined in large measure by the unloaded opening 26 (FIG. 2) between the work rolls 18 and 20. Conventional screwdown apparatus including a direct current screwdown motor 28 is used for setting the work roll unloaded opening 26. A suitable screwdown position control 27 operates the motor 28 under computer position control. Actual workpiece exit thickness substantially equals the unloaded work roll opening 26 plus the amount of mill stretch or roll separation produced by the presence of the workpiece 16 between the work rolls 18 and 20. A conventional load cell 35 generates an electrical analog signal representative of the roll separating force during workpiece rolling, and a suitable speed sensor 29 and a digital screwdown position sensor 31 generate feedback signals for programmed computer control of the screwdown apparatus.

Workpiece support at the entry side of the main stand 12 is provided by a typical entry table 28. Entry table rolls 30 are power driven by a conventional drive arrangement including motor drive means 32. Startup and shutdown operation and motor speed control are provided by suitable entry table control 34 under computer sequencing and table speed control. A speed sensor 33 such as a tachometer provides an entry table speed signal for computer use.

Similarly, workpiece support at the delivery side of the main stand 12 is provided by a conventional delivery table 36 having rolls 38 powered by motor drive means 40. Sequencing operation and table speed determination are computer specified and effected by a suitable delivery table control 42. A speed sensor 41 provides delivery table speed detection for computer control purposes. An "odd pass" of the workpiece 16 is defined as one in which the workpiece moves from the mill entry side to the mill delivery side. An even pass involves opposite motion.

Since the workpiece 16 must be changed from time to time from a position in which it lies on its edge to one in which it lies on its flat side or vice versa, conventional left and right manipulator sideguards 44 (only the right hand one is shown in FIG. 1) and associated conventional manipulator fingers 46 are provided in this case on the delivery side of the mill stand 12. Once the workpiece 16 is positioned as required, the sideguards 44 serve as guides which define the workpiece path of movement along the rolls 38. Similar sideguards (not shown) can be provided on the mill entry side, and they may or may not serve as manipulators.

Generally, the manipulator sideguards 44 are horizontally movable toward or away from the longitudinal centerline of the delivery table 36. The manipulator fingers 46 are pivotally movable in relation to the sideguards 44. When horizontally positioned, the fingers 46 lie between the rolls 38 below the top roll surface and accordingly can be used to provide workpiece lifting force as they are pivoted toward the illustrated vertical position. Combined manipulator sideguard and finger movements when appropriately sequenced and position controlled through respective suitable drives and controls 48 and 50 under computer supervision produce the required workpiece turning and handling operations. Conventional left and right digital manipulator sideguard position sensors 45 and conventional left and right digital finger position sensors 47 generate electrical position signals for programmed computer use.

The edger stand 14 is provided in the universal slabbing mill 10 on the delivery side to produce workpiece edge reduction as the workpiece 16 is being flat rolled for thickness reduction in the main stand 12. As in the typical case, the edger stand 14 is provided with a pair of horizontally spaced vertical rolls 52 and 54 which are driven by a single overhead direct current motor 56 coupled thereto. The rolls 52 and 54 are movable toward and away from the entry table centerline by means of respective conventional edger position motors 58 (only one shown). A universal joint coupling arrangement (not shown) allows the edger rolls 52 and 54 to be positioned horizontally as they are powered vertically. Suitable left and right edger position controls 60 act under computer sequencing and positioning control in operating the edger position motors 58 and positioning the edger rolls 52 and 54 as required during an edge working workpiece pass. Conventional edger roll digital position sensors 62 provide position feedback signals for computer system control.

An edger motor control circuit 64 determines the operating speed of the edger rolls 52 and 54 under computer control. Edger speed is controlled to match the main stand speed, i.e. the edger roll speed is related to the main roll speed in such a way that the edger rolls 52 and 54 substantially neither drive nor are driven by the main mills 18 and 20 through the medium of the workpiece 16. The amount of main stand draft affects the roll speed relationship needed for speed matching on the passes where the workpiece 16 moves through the edger mill before entering the main mill, in this case on even passes, and the edger speed control is therefore described as providing draft compensation in effecting computer determined speed match conditions. Further consideration of edger speed matching is presented in prior U.S. Pat. 3,363,441, entitled Speed Control System for Edger and Other Rolls in a Reduction Rolling Mill, and issued to the present inventor on Jan. 16, 1968.

A speed feedback signal is provided by a conventional sensor 66 for programmed computer control of the edger motor speed. An armature current sensor 68 and an armature voltage sensor 70 generate feedback signals for programmed computer operation including determination of edger motor power and torque which are needed in making the edger system control action determinations.

Figure 4:
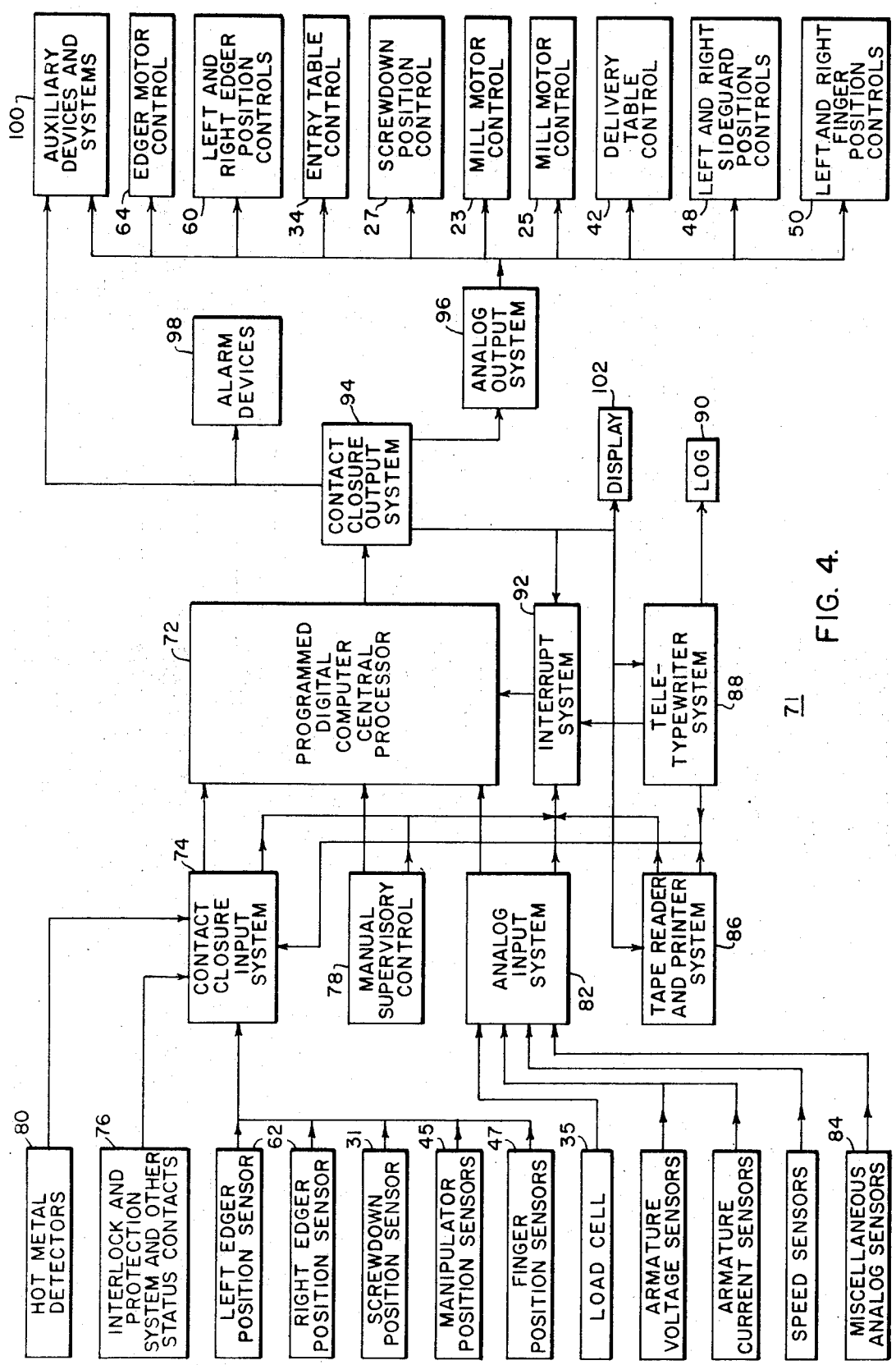
FIG. 4 shows a schematic diagram of a digital computer control system which operates the universal slabbing mill of FIG. 1.
Figure 5:
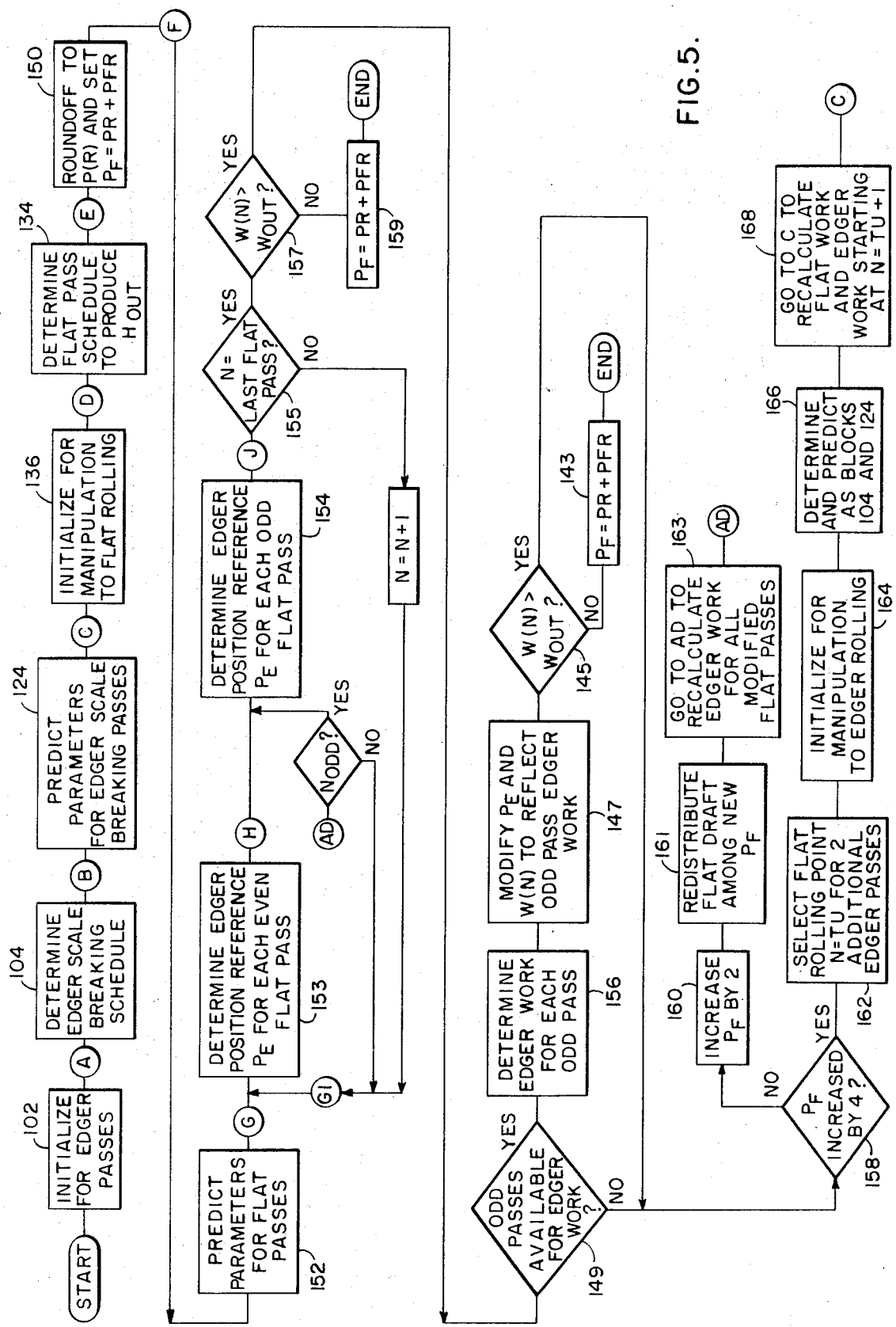

As illustrated in FIG. 4, a programmed digital computer control system 71 is provided for operating the slabbing mill 10 with improved performance characteristics. It can include conventional hardware in the form of a central processor 72 and associated input/output interfacing equipment such as that sold by Westinghouse Electric Corporation under the trade name Prodac 50 (P50). In other cases such as when the slabbing mill 10 as well as other steel plant operating units in manufacturing flow relation to the mill 10 are all placed under computer control, use can be made of a larger computer system such as that sold by Westinghouse Electric Corporation and known as the Prodac 250 or separate computers such as P50 computers can be employed for the respective controlled plant units. In the latter case, control process interaction is achieved by tieing the separate computers together through data links and/or other means.

Generally, the P250 typically uses an integral magnetic core 16,000 word (16 bit plus parity) memory with 900 nanosecond cycle time, an external magnetic core 12,000 word or more (16 bit plus parity) memory with 1.1 microsecond cycle time and a mass 375,000 word or more (16 bit plus parity) random access disc memory unit. The P50 processor typically uses an integral magnetic core 12,000 word (14 bit) memory with 4.5 microsecond cycle time.

The interfacing equipment for the computer processor 72 includes a conventional contact closure input system 74 which scans contact or other similar signals representing the status of various mill and equipment conditions. Such contacts are indicated by the reference character 76 and would for example include position limit switch contacts for the edger rolls 52 and 54 and the manipulator sideguards 44 and the screwdown apparatus, on-off indicator contacts associated with all of the motors, etc. The status contacts might typically be contacts of mercury wetted relays (not shown) which are operated by energization circuits (not shown) capable of sensing the predetermined conditions associated with the various mill devices. Status contact data is used in interlock logic functioning in control and other programs, protection and alarm system functioning, programmed monitoring and logging and demand logging, functioning of a computer executed manual supervisory control 78, etc.

The contact closure input system 74 also accepts digital signals from conventional hot metal detectors 80 and from the left and right edger position sensors 62, the screwdown position sensor 31 and the manipulator and finger position sensors 45 and 47. As shown in FIG. 1, the hot metal detectors 80 are spaced along the length of the slabbing mill 10 to sense the presence or absence of the workpiece 16 thereunder. The number and placement of the hot metal detectors 80 is determined by the mill design and the functional needs of the control system. Use is made of the hot metal detector signals in table speed control and sequencing, stand speed control and sequencing, interlock logic functioning, etc.

Input interfacing is also provided by a conventional analog input system 82 which samples analog signals from the mill 10 at a predetermined rate such as fifteen points per second for each analog channel input and converts the signal samples to digital values for computer entry. The analog signals are generated by the load cell 35, the armature current and voltage sensors 15, 17, 19, 21, 68 and 70, the speed sensors 11, 13, 29, 33, 41 and 66 and miscellaneous analog sensors 84 such as miscellaneous equipment and lubricant operating temperature detectors, miscellaneous flow detectors, etc. If desired, the various position sensors can be conventional digital output devices which are interfaced with the computer through the contact input system 74. The computer counterparts of the analog input signals are used in control program execution, protection and alarm system functioning, programmed and demand logging, etc.

Information input and output devices provide for computer entry and output of coded and noncoded information. These devices include a conventional tape reader and printer system 86 which is used for various purposes including for example program entry into the central processor core memory. A conventional teletypewriter system 88 is also provided and it is used for purposes including for example logging printouts as indicated by the reference character 90.

A conventional interrupt system 92 is provided with suitable hardware circuitry for controlling the input and output transfer of information between the computer processor 72 and the slower input/output equipment. Thus, an interrupt signal is applied to the processor 72 when an input is ready for entry or when an output transfer has been completed. In general, the central processor 72 acts on interrupts in accordance with a conventional executive program. In some cases, particular interrupts are acknowledged and operated upon without executive priority limitations.

Output interfacing is provided for the computer by means of a conventional contact closure output system 94 which operates in conjunction with a conventional analog output system 96. Certain computer digital outputs are applied directly from the contact output system 94 in effecting program determined and contact controlled control actions of equipment including alarm devices 98 such as buzzers and displays and some predetermined plant auxiliary devices and systems 100. Computer digital information outputs are similarly applied directly to the tape printer 86 and the teletypewriter system 88 and display devices 102.

Other computer digital output signals are first converted to analog signals through functioning of the analog output system 96. The analog signals are then applied to some of the auxiliary devices and systems 100, the edger motor control 64, the edger position motor control 60, the entry and delivery table controls 34 and 42, the screwdown position control 27, the mill motor controls 23 and 25 and the sideguard and finger position controls 48 and 50 in effecting program determined control actions.

A slabbing mill control programming system is employed to operate the computer system 71. It includes control and related programs as well as certain conventional housekeeping programs directed to internal control of the functioning of the computer system itself. The latter include the following:

(1) Priority executive program

Controls the use of the processor circuitry. In general, it does so on the basis of priority classification of all of the control and housekeeping programs and some of the various kinds of interrupts. The highest bidding program or interrupt routine is determined and allowed to run when a change is to be made in the programmed instructions undergoing execution. Some interrupt routines run outside the priority structure as already indicated, particularly where safety and/or expensive equipment protection are involved.

(2) Analog scan

Periodic execution for the entry of predetermined analog inputs which have been converted by the analog input system 82 and stored in the analog input system buffer register.

(3) Status contact scan

Periodic execution for the entry of predetermined status contact inputs.

(4) Programmers entry program

Demand execution allows the computer operator to enter information into the computer memory.

(5) Diagnostic routine

Executed upon computer system malfunction interrupt.

The programming system control and related programs include the following:

(1) Data logging

Periodic or demand execution for printout of predetermined events and parameter values.

(2) Alarm

Periodic and process interrupt execution for operating the alarm devices 98 and other system devices and for supervising and/or disabling the mill control programs.

(3) Display

Periodic and demand execution for visual display (alphanumeric or graphic) of predetermined parameter values and/or trends.

(4) Auxiliary devices and systems program

Periodic execution for supervisory control.

(5) Workpiece manipulation program

Periodic or demand execution for control purposes.

(6) Scheduling program

Demand execution prior to workpiece entry into horizontal rolls 18 and 20.

(7) Slabbing mill operations and adaptive scheduling program

Periodic execution during mill operation for table and edger stand and main stand control and for updating the mill schedule after workpiece entry into the mill.

The present invention primarily involves the functioning of the latter two programs and further specific programming system description herein will accordingly be more or less limited to them. Reference is made to FIGS. 5–11 where flow charts including certain algorithms are shown as a representation of the basic logic content of these programs. Actual programs entered into the computer system 71 are coded in machine language from more detailed flow charts which are in turn derived from the illustrated flow charts.

After the mill 10 and the computer system 71 are in an operating state and an ingot is obtained from the ingot buggy for entry on edge into the mill 10, the scheduling program is executed by operator or suitable automatic demand. In block 102 (FIG. 5), initialization data is retrieved for the ingot being entered on edge into the mill 10. The initialization accepts data on the ingot material such as alloy and temperature data, and it sets the following:

Equation (1)

$H(O) =$ workpiece entry height $= W_{\text{IN}} + 1$ inch $=$ ingot width $+1$ inch Equation (2)

$W(Q) =$ workpiece entry width $= H_{\text{IN}} + 1$ inch $=$ ingot thickness $+1$ inch Equation (3)

ingot weight from data input $= W$

Equation (4)

ingot volume $= W/.260$ lb./in.$^3$

The one inch supplement in H(O) and W(O) provides protection against variations in ingot dimensions resulting from ingot mold wear and the like. If two or more ingots are to be rolled in tandem, the initialization data for each is obtained. One of the principal limits on tandem rolling is the available roller table length for workpiece movement. Programming for tandem rolling accordingly includes provision for splitting and parking one or more tandem workpieces when the aggregate workpiece length is approaching the limit value.

In block 104, the edge scale breaking schedule is determined. As shown more fully in FIG. 7, block 106 determines the maximum edge draft or the minimum allowed delivery height allowed by each applied mill constraint. In this case, the following algorithms are used:

Equation (5)

$HD = H(N-1) - D_M =$ minimum delivery height as limited by maximum draft where:

$D_M =$ maximum allowed draft
$H(N-1) =$ entry height to pass N

Equation (6)

$HPD = H(N-1) \cdot D_{PM} =$ minimum delivery height as limited by maximum percent draft where:

$D_{PM} =$ maximum allowed percent draft

Equation (7)

$$HT = H(N-1) - \frac{T_{\text{MAX}}}{W(N-1) \cdot T_1[T_2 + T_3 \cdot H(N-1)] \cdot D_{\text{MR}}}$$

$=$ minimum delivery height as limited by maximum motor torque where:

$T_{\text{MAX}} =$ maximum allowed motor torque
$W(N-1) =$ entry width to pass N
$T_1$ is a torque correction factor
$T_2$ and $T_3$ are torque constants
$D_{\text{MR}} =$ main roll diameter.

In block 108, the scheduled height H(N) for pass N is selected as the largest of HD, HPD, and HT. In this manner, the mill draft is set at the maximum value allowed by the mill constraints.

The same procedure is repeated until block 110 indicates H(N) is less than the order specified slab width $W_{OUT}$ plus one inch or until counter comparison block 112 and counter 113 indicate the preferred maximum of three edge scale breaking passes have already been scheduled. If H(N) is less than the target height, block 114 makes the total scale breaking passes $P_{SB}$ equal to 1 if block 116 indicates two passes have been scheduled. If one or three passes have been scheduled, $P_{SB}$ is made equal to 1 or 3 as the case may be in block 118 and the scheduled draft is operated upon by a roundoff routine in block 120 to make H(N) equal to $W_{OUT}$ plus one inch. The one inch allowance provides an edge drafting load for edge working during flat rolling. When the maximum count of 3 is reached without making H(N) equal to $W_{OUT}$ plus one inch, block 122 makes $P_{SB}$ equal to 3 and the edge drafting load during flat rolling is equal to the ingot entry height $W_{IN}$ less the scheduled scale breaking edge drafting plus main stand spread.

After each pass scheduling, block 124 (FIG. 1) predicts certain mill parameters during the scheduled edge scale breaking operation. As shown more fully in FIG. 8, the expected delivery width W(N) is first determined in block 126 by summing the entry width with the spread expected to be produced by the height reduction:

Equation (8)

$$W(N) = W(N-1) + K_S[H(N-1) - H(N)]$$

where:

$K_S$ = known spread constant.

In block 128, the edger position reference $P_E$ is made greater than the expected workpiece width since the edger rolls 52 and 54 perform no work during edge scale breaking.

Since the draft for each scale breaking pass is already scheduled by block 108, it is possible to schedule the work roll opening 26 and the corresponding screwdown position for each edge pass and it is also possible to predict the main stand roll separating force and the main stand torque and horsepower load for each edge pass. In this case, the horsepower prediction is made for base speed operation. Normally, the workpiece 16 enters the work rolls 18 and 20 at base speed and subsequently undergoes acceleration to a maximum speed limited either by the stand horsepower or operating speed limit or by the length of the workpiece 16. Length produces a limit on the maximum workpiece speed because the workpiece 16 must be decelerated to base speed as its tail end emerges from the exit side of the work rolls 18 and 20.

The following equations are used in block 130 for the calculations:

Equation (9)

$$T_P = [H(N-1) - H(N)] \cdot W(N-) \cdot T_1 \cdot [T_2 + T_3 \cdot H(N-1)]$$

where:

$T_P$ = predicted torque, assuming constant torque load

Equation (10)

$$F_P = \frac{T_P \cdot F_1}{\sqrt{H(N-1) - H(N)}[F_2 + F_3 \cdot H(N-1)]}$$

where:

$F_P$ = predicted force
$F_1$ is a force connection factor
$F_2$ and $F_3$ are constants Equation (11)

$$HP_P = T_P \cdot D_{MR} \cdot 40/K_H$$

where:

base motor speed is equal to 40 r.p.m. and maximum allowed motor speed is equal to 80 r.p.m.

$K_H$ = constant

Equation (12)

$$SD = H(N) - K_{MS} \cdot F_P = \text{scheduled screwdown position}$$

where:

$K_{MS}$ = main spring constant

Counter comparison block 132 and counter 133 loop the program through blocks 126, 128 and 130 until the calculations have been made for all of the scheduled edge scale breaking passes $P_{SB}$.

The flat rolling schedule is determined in block 134 after the height, width and other parameters are initialized for the manipulation to flat rolling in block 136. As shown more fully in FIG. 9, block 138 determines the minimum allowed delivery height for each mill constraint and block 140 selects the largest height H(N). The block 138 uses the same subroutine as that used in block 106, i.e. involving Equations 5 through 7. In the flat rolling scheduling, the workpiece width is assumed to be constant as indicated by block 142. Actually, the workpiece width spreads during workpiece reduction and this effect is taken into consideration by the edge working schedule. Block 143 provides the scheduled draft compensation DC for edger speed, i.e. $DC=1$ for odd passes and $$DC = H(N-1) - H(N)/H(N-1)$$

for even passes. This calculation reflects use of a pilot generator and rheostat circuit which compensates for main and edger roll diameter difference.

Comparison block 144 ends the flat pass scheduling once the delivered height H(N) from the last scheduled pass is equal to or less than the order specified slab height $H_{OUT}$. The existing count for N in counter block 146 is then specified as the tentative total number of flat passes PF in block 148. Prior to program routing to the block 148, the counter 146 cycles the program through the blocks 138–144 until the flat pass scheduling is ended. Since the actual delivery height may be less than the specified value at this point, roundoff may be required and the last six scheduled passes are preferably scheduled for any required roundoff operation. Thus, the first pass included in the roundoff is identified by the reference character PFR and the last roundoff pass is PFR plus 6 or pass PF.

Block 150 makes the roundoff determination. Generally, the roundoff subroutine adjusts the drafting to give a minimum odd number of total passes with the specified delivery height after the last pass. The provision of an odd last pass assures workpiece delivery on the delivery side of the mill 10. More specifically, a calculation is made of the minimum number of passes required to produce the desired delivery height. This may or may not be a whole number. If required, the minimum pass number is increased to the next higher odd whole number.

Figure 3:
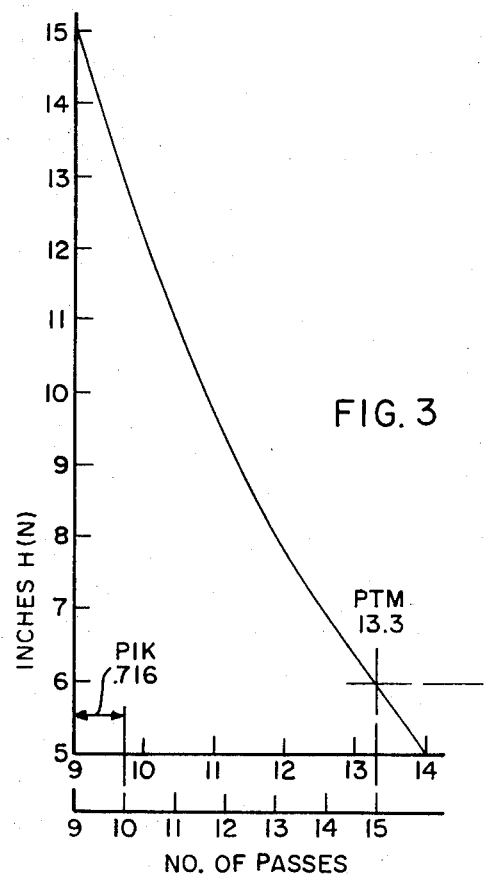
FIG. 3 shows a draft schedule curve which illustrates how a round-off routine is used to deliver a desired slab thickness from a whole number of odd passes.

As graphically illustrated in FIG. 3 by a curve 151 of height versus pass number, the minimum number of 13.3 passes in that particular case is increased to 15 passes. In the case of FIG. 3, entry to roundoff block 150 would thus have occurred at $PF=N=14$ in the block 148 (FIG. 9).

Next, a multiplying factor is determined in effect to shrink the abscissa scale and cause the specified delivery height to be achieved exactly with the minimum odd whole number of passes. In FIG. 3, the multiplier $P_{IK}$ is determined to be .716. A shrinkage of 100% minus 71.6% or 28.4% is thus required to achieve roundoff with a minimum number of odd passes. Once the multiplier $P_{IK}$ is determined, the flat drafting schedule for the rounded off passes is recalculated. The recalculation for the case of FIG. 3 is as follows:

| Tentative schedule | | Roundoff schedule | |
| --- | --- | --- | --- |
| N | H(N) | N | H(N) |
| 9 | 15 | 10 | 12.85 |
| 10 | 12 | 11 | 10.97 |
| 11 | 9.6 | 12 | 9.32 |
| 12 | 7.7 | 13 | 7.97 |
| 13 | 6.4 | 14 | 6.95 |
| 14 | 5.1 | 15 | 6.00 |

In the edge scale breaking scheduling, the roundoff in block 120 can be similar to that just described.

After roundoff, block 152 schedules the work roll opening (screwdown position) for each scheduled flat pass and it predicts the main stand roll separating force and torque and horsepower load for each flat pass. Horsepower is again predicted at base speed. Block 152 is more specifically illustrated in FIG. 10. Equations 9 through 12 are employed as previously for the flat pass calculations.

Edge work requirements during flat rolling are determined after the flat rolling schedule is specified. Preferably, edge work required to produce the order specified slab width is first scheduled in block 153 for even flat passes because of the facility of workpiece guidance through the edger rolls 52 and 54 on these passes. The amount of required width reduction may be one inch if block 120 in FIG. 7 has been executed or it may be more than one inch if block 114 or 122 has been executed.

When the block 153 cannot perform all the required edge work as determined by blocks 155 and 157, blocks 149 and 156 schedule edger position reference $P_E$ which will produce edge work for the odd flat passes beginning with the odd passes at the delivery end of the schedule. In specfying the reference $P_E$, it is justifiably assumed that the edger mill functions without spring stretch. In any event, the edger position reference $P_E$ in each unloaded odd flat pass and the edger position reference $P_E$ for a loaded last odd pass are scheduled in block 154. Edge work in the last odd pass provides for edge shaping and removal of spread from the last flat pass. If all required edge work is scheduled during the even and last odd flat passes as determined in blocks 155 and 157, block 159 records the flat pass schedule as final. If required edge work cannot be performed during all of the scheduled even and last odd flat passes, the block 156 schedules odd pass edge work and the edger position reference $P_E$ from the blocks 153 and 154 is modified in block 147 for all even and odd passes affected by the added odd pass or passes in which edge work is performed.

If added odd pass edge work produces the required slab delivery width $W_{OUT}$ as determined in block 145, the flat rolling schedule is finalized in block 143 as in the block 159. If all possible odd pass edge work falls short of requirements, flat passes are added in two's up to a total of four by blocks 158 and 160. Block 161 then recalculates the drafts for the flat passes to reflect the larger number of flat passes, for example the last six passes can be rounded off as previously considered. Edge work recalculation for the changed flat passes is initiated by block 163.

If the program is still unsuccessful in scheduling all of the required edge work, block 162 then schedule a turnup for additional edge pass work. The turnup is made at a point in the flat rolling schedule where the thickness is adequately reduced so that the turnup edge work is effective yet not reduced so much that the workpiece would be too thin to turn on its edge. In most cases, the turnup point is preferably scheduled after the fourth pass and after the workpiece thickness is less than 60% of the workpiece width.

Block 164 initializes for the turnup edge rolling and block 166 determines the edge rolling schedule and parameter predictions in a manner similar to that described for blocks 104 and 124. Thereafter, block 168 directs program execution to block 136 for recomputation of the flat rolling schedule and the remaining edge work schedule for all flat passes remaining after the turnup flat pass $N=TU$.

Figure 11:
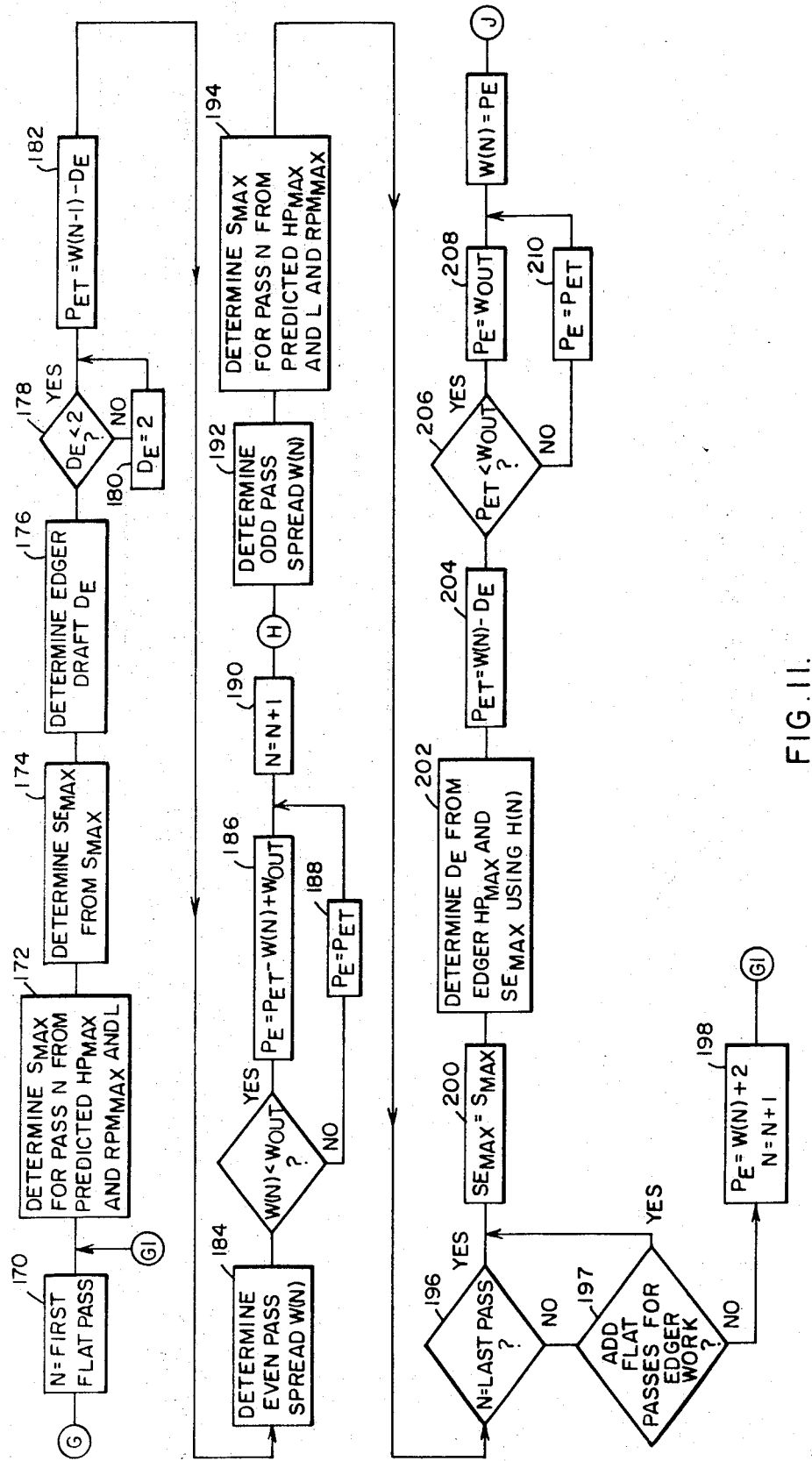

The initial edger position reference $P_E$ is determined for each even pass and each flat pass as more specifically illustrated in FIG. 11. Block 170 identifies the first flat pass as an even pass N and block 172 determines the maximum mill (workpiece) speed $S_{MAX}$. First, a mill speed limit is determined from the predicted main motor base speed horsepower as follows:

Equation (13)

$$\text{r.p.m.} = \frac{HPM \cdot 40}{H_D(N)}$$

where:

HPM=current limit maximum drive horsepower or about 225% of rated.

The mill speed limit $S_{MAX}$ is also prevented from exceeding a value corresponding to the maximum motor speed, in this instance 80 r.p.m.

The workpiece delivery length is computed for the pass being scheduled as follows:

Equation (14)

$$L = \frac{V}{H(N) \cdot W(N-1)}$$

where:

V=workpiece volume.

A determination is made of the workpiece delivery length $L_{AD}$ produced during acceleration from base speed to maximum mill speed RPM and deceleration to base speed at the tail end of the piece:

Equation (15)

Maximum mill speed (inches/second)

$$= \frac{\text{r.m.p.} \cdot D_{MR}}{C_1} = IPSM$$

Equation (16)

$$L_{AD} = \frac{t_1 \cdot (IPSM^3 - C_2)}{C_3}$$

where:

$C_1$ and $C_2$ and $C_3$ are constants
$t_1$=time for base speed to base speed operation.

If $L_{AD}$ is longer than L, $S_{MAX}$ is made equal to IPSM. If $L_{AD}$ is shorter than L, the workpiece is too short to reach IPSM and $S_{MAX}$ is determined from the available workpiece length within the speed schedule requirements of accelerating from base speed to the length limited maximum mill speed and decelerating to base speed at the workpiece tail end.

In block 174, the maximum edger speed $SE_{MAX}$ is computed from the maximum mill or workpiece speed $S_{MAX}$. This computation reflects edger draft compensation, i.e., the edger speed is valued to correspond to actual workpiece speed at the edger as affected by the amount of main stand draft. The edger motor speed is limited to 300% rated if necessary, and the maximum edger draft $D_E$ is then determined in block 176 from the value for $SE_{MAX}$, the maximum edger horsepower (5000 HP in this case), and the edger armature voltage which may not reach rated value if the edger motor does not reach base edger motor speed at the maximum mill speed for the pass being scheduled. Finally, the edger draft $D_E$ is limited to 2 inches maximum by blocks 178 and 180. The following equation is used to compute $D_E$:

Equation (17)

$$D_E = \frac{EHP_{MAX} \cdot PUVE}{H_{AE} \cdot T_1 \cdot [T_2 + T_3 \cdot W(N)] \cdot IPSE}$$

where:

$EHP_{MAX}$ = maximum edger horsepower
$PUVE$ = multiplier which proportionally reduces $D_E$ for voltage drop below rated
$IPSE$ = workpiece speed through edger (inches per second)
$H_{AE}$ = workpiece height at the edger.

A tentative edger position reference $P_{ET}$ is next determined for the pass being scheduled in block 182 by subtracting the scheduled edger draft $D_E$ from the entry width $W(N-1)$. The expected delivery width $W(N)$ after main rolling spread is determined in block 184. If the expected delivery width $W(N)$ is less than specified slab width $W_{OUT}$, the edger position reference $P_E$ is made equal in block 186 to the tentative value $P_{ET}$ adjusted by excessive width reduction. If the expected delivery width $W(N)$ is greater that $W_{OUT}$, $P_E$ is made equal to $P_{ET}$ in block 188.

Counter block 190 then advances the pass count to the next pass which is an odd pass. The main roll spread is computed in block 192 and the odd pass maximum mill speed is determined in block 194 as in block 172. If the pass being scheduled is not the last pass as indicated by block 196 and if no flat passes are to be added as directed by block 160 and block 197, the edger position demand $P_E$ is made equal to $W(N)$ plus 2 inches in block 198 so that no odd pass edge work will be performed. The pass count is advanced and program execution then goes to block 172 for the next even pass. However, if the odd pass being scheduled is the last pass of if flat passes have been added by the block 160 as indicated by the block 197, block 200 makes the maximum edger speed equal to $S_{MAX}$ from the block 194 (since the workpiece is moving from the main mill stand to the edger stand) and block 202 determines the odd pass edger draft $D_E$ in a manner similar to that described for the block 176. The tentative edger position reference $P_{ET}$ is specified in block 204 as the present main stand delivery width $W(N)$ less the edger draft $D_E$. Blocks 206, 208, 210 and 212 determine the final value of the edger position demand $P_E$ as either $W_{OUT}$ or $P_{ET}$.

In review of the flat pass edge work scheduling, blocks 172 through 188 first schedule all available even passes for edge work. As this scheduling is being completed, the block 198 schedules edger position reference for all odd passes except the last one. Block 212 defines the last odd pass edger position reference if all edge work was not scheduled on previous even passes. If additional edge work is required, the block 156 schedules odd pass edge work and the block 147 modifies the previous even and odd pass scheduling affected by the add odd pass edge work. Additionally required edge work is produced by added flat passes in the block 160 with the previous even and odd pass flat drafting and edge schedules revised through the operation of the blocks 161 and 163. If the program still has not succeeded in producing all of the required edge work, the workpiece 16 is scheduled for turnup by the block 162, the turnup schedule is determined, and the flat draft and edge schedules are recomputed for the flat pass after the turnup pass and for all subsequent scheduled flat passes to the delivery end of the schedule.

The scheduling program determines the minimum number of workpiece passes which are to be used in producing the specified product from the input ingot with minimum process time and minimum edge working. The distribution of flat drafting and edge drafting is scheduled efficiently within mill constraints and within the bounds imposed by scale breaking requirements and edge working limits.

During the time period prior to the first workpiece pass when the scheduling program is being executed, the slabbing mill operations and adaptive scheduling program is also being executed. Thus, block 212 sets the entry and delivery table motor controls and the edger and main roll motor controls for base mill speed operation. Further, once the scheduling is completed, the screwdown motor 28 is operated to execute the scheduled screwdown position for the first pass (i.e. the first edge scale breaking pass). The screwdowns are preferably kept well calibrated so that the actual unloaded roll opening will substantially equal the scheduled roll opening. The edger position motors 58 are also operated to space the edger rolls 52 and 54 in accordance with the edger work schedule (i.e. no work on the first edge scale breaking pass). The operations and adaptive program similarly determines edger and main roll operation and screwdown operation in the time period between subsequent passes.

When the block 214 determines that the workpiece 16 is clear for the first pass, i.e. all interlocks have been satisfied to allow the entry table 28 to drive the workpiece to the work rolls 18 and 20 and the load cell 35 signifies actual workpiece entry into the roll bite, the predetermined mill speed pattern is applied by block 216 to the main mill motor controls 23 and 25 and the entry and delivery table controls 34 and 42. As rolling time progresses, the program is repeatedly executed and block 216 thereby causes the mill speed to rise from base value to the prescheduled maximum value and then to drop to the base value at the workpiece tail end.

During the first pass, the edge rolls may be operated at idle or edger base speed value. During flat passes when the edger rolls perform work, the edger motor control 64 is controlled to cause the edger rolls to follow the mill speed pattern. On even passes, the scheduled amount of draft compensation DC is modified if required in block 218 from feedback motor load data to match the edger and main roll speeds. Thus, the edger horsepower is detected when the workpiece 16 is in the edger mill only and when the workpiece is in the edger and main mills together. Any difference is used to adjust the edger power level for speed match.

As the workpiece pass progresses, block 220 provides for data collection. Block 222 assures continued data collection and mill speed control until the pass is ended. The data is derived from the previously described sensors through the computer input interfacing systems and it includes the work roll force F, the screwdown position SD, the main motor armature currents $I_M$ and voltages $V_M$, the main motor speeds $S_M$, the edger motor armature current $I_E$ and voltage $V_E$, the edger motor speed $S_E$ and the actual edger position $P_{EA}$. The main motor armature currents and voltages are respectively summed and then multiplied together in the process of determining average main mill motor horsepower. This provides for torque measurement adequate for schedule updating purposes.

After the first edge scale breaking pass and after each subsequent edge and flat pass, the relevant data is analyzed in block 224 for necessary or desirable adaptive rescheduling. The scheduled number of passes is reduced if the rescheduling calculations show that the workpiece reduction can be performed in fewer passes than that number previously scheduled, or the scheduled number of pases is increased if mill constraints require the total work to be spread over more passes than the number previously scheduled. Normally, fewer passes can be used if the actual hardness of the workpiece 16 is significantly less than the anticipated hardness reflected in the draft scheduling model equations including Equations 7, 12 and 17. More passes would be required if the actual workpiece hardness is significantly greater than the anticipated hardness. If the operation of the block 218 indicates a need for updating, block 226 adjusts the draft compensation DC previously computed in the bock 143 and the new value for DC is then stored for future passes.

In the data analysis, the actual mill and edger drafts are first computed in block 228 (FIG. 6A) for the hardest of all of the ingots being tandem rolled or for the single ingot in a single ingot pass. If desired, however, the calculation in block 228 as well as subsequently described blocks 230 and 232 can be performed for all ingots in a tandem rolling. The hardest ingot is detected by comparing the roll forces for tandem ingots and selecting the ingot producing the highest roll force.

Mill delivery height for the hardest ingot is calculated as follows:

Equation 18
$$H_A = SD_A + K_{MS} \cdot F_A$$
where:

$SD_A$=measured screwdown position
$F_A$=average measured roll force
$K_{MS}$=mill spring constant Edger draft $D_{EA}$ is calculated for edge working passes by subtracting the measured edger position $P_{EA}$ from the workpiece width at the edger entry point. In turn, the edger entry width is the main roll delivery width on odd passes or the finish width from the previous pass if the current pass is an even pass. Once the edger draft is calculated on odd passes, the spread resulting during main roll draft is recomputed for rescheduling use on the basis of the actual rather than the predicted edger draft.

After the actual drafts $[H(N-1) - H_A]$ and $D_{EA}$ are determined, block 230 provides for recalculating the predicted torque $T_P$ and the predicted roll force $F_P$ using the actual drafts. Equations 9 and 10 are employed for this purpose The torque correction factor $T_1$ is then recalculated by making it equal to the ratio of the average measured torque for the hardest ingot in the pass to the repreciated torque as follows:

Equation (19)
$$T_{AVE} = \frac{HP_{AVE} \cdot K_H}{D_{MR} \cdot 40}$$

Equation (20)
$$T1 = \frac{T_{AVE}}{T_P}$$

Similarly, the force correction factor $F_1$ is recalculated by making it equal to the ratio of the average roll force for the hardest ingot in the pass to the repredicted roll force as follows:

Equation (21)
$$F_1 = \frac{F_{AVE}}{F_P}$$

Block 232 then checks the new correction factors $F_1$ and $T_1$ to make sure they are within stored limit values. Block 234 then updates the $F_1$ and $T_1$ values stored for use in the flat and edge draft scheduling equations. Each updated value is made equal to the old value times the newly computed value. If the data for all ingots had been processed through blocks 228 through 232, block 234 would select the correction factors $F_1$ and $T_1$ associated with the hardest ingot in a tandem rolling.

In block 236, the main mill base speed horsepower $HP_P$ is recalculated for the next pass as follows:

Equation (22)
$$HP_P \text{ (new)} = T_1 \cdot \frac{H_A - H(N)}{H(N-1) - H(N)} \cdot HP_P$$

where:

$H(N-1)$=previously scheduled delivery height from pass just completed
$H(N)$=previously scheduled delivery height from next pass
$T_1$=updated torque correction factor Similarly, the edge horsepower required to produce edge draft scheduled for the next flat edge working pass is recalculated from any actual edge draft produced in the present (flat) pass:

Equation (23)
$$EHP \text{ (new)} = T_1 \cdot \frac{D_E(N) + [D_{EA} - D_E(N-1)]}{D_E(N)}$$

where:

$D_E(N)$=edge draft scheduled for next pass
$D_E(N-1)$=edger draft scheduled for pass just completed
$D_{EA}$=actual edger draft for pass just completed
$T_1$=updated torque correction factor.

Thereafter, block 238 determines whether the scheduled number of passes should be increased to hold the mill operation within constraints. New scheduling caluclations are initiated in block 134 to increase the number of workpiece passes if the main mill horsepower $HP_P$ (new) is greater than rated, the new draft $[H_A - H(N)]$ is greater than the maximum (such as four inches maximum), the persent draft $H(N)/H_A$ is greater than the maximum allowed percent draft, or the edger horsepower EHPP (new) is greater than rated.

If rescheduling is not required to add passes, block 240 determines whether rescheduling ought to be initiated in an attempt to reduce the number of passes within mill constraints. First, a determination is made whether the workpiece is softer than expected, i.e. whether the updated $T_1$ is less than 1. If not, the program execution is ended and the next execution begins at point S1 for mill set up for the next pass unless block 241 indicates the last pass has been completed to end the program. If $T_1$ is less than 1, a determination is made whether one or more passes and in this case preferably two passes can be saved:

Equation 24
$$(1 - T_1) \cdot [PF - N] > 2$$
where:

PF=total passes in present schedule
N=passes remaining in present schedule.

If Equation 24 holds true, it is likely that two passes can be saved and the program is directed to block 134 for rescheduling which will likely though not necessarily produce a new schedule in the manner previously described. Otherwise, the program operation goes to point S1 as previously. The requirement of a saving of two passes enables the workpiece to be finished on the delivery side of the mill. If the savings requirement were reduced to one pass, the workpiece might then finish on the entry side of the mill, and the main rolls would have to be opened to allow free movement of the workpiece to the delivery side of the mill.

The workpiece reduction schedule is thus adapted to actual rolling conditions after each workpiece pass. The original schedule is computed for minimum rolling time and minium edge working within system constraints on the basis of predicted operating parameters, and the adaptive program operations either confirm the original schedule or trim the original schedule to more or fewer passes as required.

The foregoing description has been presented only to illustrate the principles of the invention. Accordingly, it is desired that the invention not be limited by the embodiment described but rather that it be accorded an interpretation consistent with the scope and spirit of its broad principles.

What is claimed is:

1. A method for operating a slabbing mill having a main mill rolling stand with mill motor means for driving the stand work rolls and screwdown motor means for setting the unloaded opening between the work rolls, the steps of said method comprising determining a workpiece schedule including a workpiece reduction schedule of flat and edge passes during which flat drafts and edge drafts are to be made on at least one workpiece to reduce the workpiece from ingot size to desired slab size within mill operating constraints, determining as part of the workpiece schedule the mill setup including the respective unloaded work roll openings required during the respective passes to produce the flat drafts and at least some of the edge drafts, setting up and operating the mill in accordance with the workpiece schedule, sensing predetermined data representative of workpiece hardness during at least one pass of the schedule, and modifying the scheduled drafting and the number of passes in the workpiece reduction schedule to produce desired slab size if the number of remaining passes can be reduced within mill constraints or must be increased to satisfy mill constraints in accordance with the sensed data.

2. A slabbing mill operating method as set forth in claim 1 wherein said sensing and modifying steps are performed in response to each of a plurality of scheduled workpiece passes.

3. A slabbing mill operating method as set forth in claim 1 wherein at least two workpieces are rolled in tandem and wherein the sensing step includes sensing predetermined data representative of workpiece hardness and associated with the two workpieces, and the modifying step is performed in response to the sensed data associated with the hardest of the workpieces.

4. A slabbing mill operating method as set forth in claim 1 wherein the steps of said method further include predicting at least the main mill roll force and main mill torque for at least said one pass, and wherein the sensed data includes main mill roll force and main mill motor means armature current and armature voltage, and the workpiece reduction schedule is modified by a correction determination derived from respective comparisons of the sensed and predicted values of roll force and armature current and armature voltage.

5. A slabbing mill operating method as set forth in claim 4 wherein the main mill motor means includes respective motors for the respective work rolls, the sensed data includes armature current and armature voltage for both motors, and derivation of the correction determination includes combining the armature current values and combining the armature voltage values to compute the main mill stand horsepower.

6. A slabbing mill operating method as set forth in claim 4 wherein said reduction schedule determining step further includes the substeps of determining the substantially maximum edge and flat drafts allowed within predetermined mill constraints during successive proposed passes, rounding off the number of proposed passes to a higher whole number of passes if the proposed number is other than a whole number, setting the scheduled pass number equal to the roundoff number, redetermining the edge and flat drafts for the rounded off pass schedule, and wherein the scheduled modification step also includes said substeps of said schedule determining step.

7. A slabbing mill operating method as set forth in claim 1 wherein the mill operating constraints include respective representations of a predetermined maximum draft and a predetermined maximum percent draft and a predetermined maximum motor torque and wherein the scheduled workpiece draft and percent draft for the next pass are calculated using sensed roll force during said one pass, a representation of main stand torque is calculated for the next pass using sensed motor armature current and voltage during said one pass, and the workpiece reduction schedule is modified to increase the number of scheduled passes if any of the respective representations of the mill operating constraints are exceeded respectively by the respective next pass calculations.

8. A slabbing mill operating method as set forth in claim 1 wherein the slabbing mill is further provided with an edger stand with edger motor means for driving the edger rolls and edger position motor means for setting the opening between the edger rolls, and wherein the workpiece reduction schedule determining step includes the substeps of determining an edge scale breaking schedule of a limited number of edge passes to reduce the workpiece width to desired slab width plus at least a predetermined minimum amount within mill operating constraints, determining a flat pass schedule of successive flat drafts to reduce the workpiece height to the desired slab height within mill operating constraints, determining the amount of edge draft to be performed by the edger stand during each of the predetermined flat passes to produce the desired slab width at the end of the schedule within mill operating constraints, and wherein the mill setup determination includes a determination of the edger roll position reference required in each edge work flat pass.

9. A slabbing mill operating method as set forth in claim 8 wherein the workpiece reduction schedule determining step further includes the substep of scheduling at least one turnup edge pass after a predetermined number of flat passes to produce an amount of edge reduction which enables the desired slab width to be produced by flat pass edge work without requiring extension of the flat pass schedule beyond a predetermined number of passes.

10. A slabbing mill operating method as set forth in claim 8 wherein the edge draft determining substep provides for minimizing the number of flat passes during which edge work is scheduled to reach desired slab width.

11. A slabbing mill operating method as set forth in claim 10 wherein the minimum number of edge working flat passes is determined by scheduling substantially maximum edge drafting within mill constraints in the last odd flat pass and to the extent required in successive even flat passes and thereafter to the extent required in successive odd flat passes beginning at the delivery end of the flat rolling schedule.

12. A slabbing mill operating method as set forth in claim 11 wherein the maximum edge draft for each edge working flat pass is determined within predetermined mill constraints including maximum edger horsepower and maximum predicted mill speed for that pass.

13. A slabbing mill operating method as set forth in claim 8 wherein said sensing and modifying steps are preformed in response to at least one edge scale breaking pass and in response to at least one flat pass.

14. A slabbing mill operating method as set forth in claim 13 wherein at least two workpieces are rolled in tandem and wherein each sensing step includes sensing predetermined data representative of workpiece hardness and associated with the two workpieces and the respective modifying steps are performed in response to the sensed data associated with the hardest of the workpieces.

15. A slabbing mill operating method as set forth in claim 8 wherein the sensed data includes main mill roll force and main mill motor means armature current and armature voltage and edger motor armature current and armature voltage and edger position, and the workpiece reduction schedule is modified by a correction determination derived from the sensed edger and main mill data.

16. A slabbing mill operating method as set forth in claim 8 wherein the mill operating constraints include respective representations of a predetermined maximum flat draft and a predetermined maximum flat percent draft and predetermined maximum main mill motor torque and a predetermined maximum flat pass edge draft and a predetermined maximum edger motor horsepower, and weherein the scheduled workpiece flat draft and flat percent draft for the next pass are calculated using sensed roll force during said one pass, a representation of main stand torque is calculated for the next pass using sensed main mill motor armature current and voltage during said one pass, scheduled workpiece edge draft is calculated for the next pass using sensed edger roll position during said one pass, a representation of edger motor horsepower is calculated for the next pass using sensed edger motor armature current and voltage during said one pass, and the workpiece reduction schedule is modified to increase the number of scheduled passes if any of the respective representations of the mill operating constraints are exceeded respectively by the respective next pass calculations.

17. A method for operating a slabbing mill having a main mill rolling stand with mill motor means for driving the stand work rolls and screwdown motor means for setting the unloaded opening between the work rolls and further having an edger stand with edger motor means for driving the edger rolls and edger position motor means for setting the opening between the edger rolls, the steps of said method comprising determining a workpiece schedule including determining an edge scale breaking schedule of a limited number of edge passes to reduce the workpiece width to desired slab width plus at least a predetermined minimum amount within mill constraints, determining a flat pass schedule of successive flat drafts to reduce the workpiece height to the desired slab height within mill operating constraints, determining the amount of edge draft to be performed by the edger stand during each of predetermined flat passes to produce the desired slab width at the end of the schedule within mill operating constraints, determining the mill setup for each pass including the unloaded main mill roll opening and the edger roll position reference in each edge pass and each flat pass, and operating the mill to execute the workpiece schedule.

18. A slabbing mill operating method as set forth in claim 16 wherein the steps of said method further include scheduling at least one turnup edge pass after a predetermined number of flat passes to produce an amount of edge reduction which enables the desired slab width to be produced by flat pass edge work without requiring extension of the flat pass schedule beyond a predetermined number of passes.

19. A slabbing mill operating method as set forth in claim 17 wherein the edge draft determining step provides for minimizing the number of flat passes during which edge work is scheduled to reach desired slab width.

20. A slabbing mill operating method as set forth in claim 19 wherein the minimum number of edge working flat passes is determined by scheduling substantially maximum edge drafting within mill constraints in the last odd flat pass and to the extent required in successive even flat passes and thereafter to the extent required in successive odd flat passes beginning at the delivery end of the flat rolling schedule.

21. A slabbing mill operating method as set forth in claim 20 wherein the maximum edge draft for each edge working flat pass is determined within predetermined mill constraints including maximum edger horsepower and maximum predicted mill speed for that pass.

22. A system for operating a slabbing mill having a main mill rolling stand with mill motor means for driving the stand work rolls and screwdown motor means for setting the unloaded opening between the work rolls, said system comprising means for controlling the stand speed in acccordance with a workpiece schedule, means for controlling the screwdown motor means to set the unloaded roll opening for each workpiece pass, means for turning a workpiece between edge and flat or flat and edge positions, means for sensing predetermined mill operations data, a programmed digital computer system coupled at its input to said sensing means and coupled at its output to operate said controlling means in accordance with the workpiece schedule, a programming system for operating said computer system, said programming system determining a workpiece schedule including a workpiece reduction schedule of flat and edge passes during which flat drafts and edge drafts are to be made on at least one workpiece to reduce the workpiece from ingot size to desired slab size within mill operating constraints, determining as part of the workpiece schedule the mill setup including the respective unloaded work roll openings required during the respective passes to produce the flat drafts and at least some of the edge drafts, and modifying the scheduled drafting and the number of passes in the workpiece reduction schedule to produce desired slab size if the number of remaining passes can be reduced within mill constraints or must be increased to satisfy mill constraints in accordance with the sensed data from at least one pass of the schedule.

23. A slabbing mill operating system as set forth in claim 22 wherein said programming system further predicts at least the main mill roll force and the maximum main mill torque for at least said one pass, said sensing means senses data including main mill roll force and main mill motor means armature current and armature voltage, and said programming system modifies the workpiece reduction schedule by a correction determination derived from respective comparisons of the sensed and predicted values of roll force and armature current and armature voltage.

24. A slabbing mill operating system as set forth in claim 22 wherein the mill is further provided with an edger stand with edger motor means for driving the edger rolls and edger position motor means for setting the opening between the edger rolls, and wherein means operated by said computer system are provided for controlling the edger motor speed and edger roll position, and said programming system in determining the workpiece reduction schedule determines an edge scale breaking schedule of a limited number of edge passes to reduce the workpiece width to desired slab width plus at least a predetermined minimum amount within mill operating constraints, a flat pass schedule of successive flat drafts to reduce the workpiece height to the desired slab height within mill operating constraints, and the amount of edge draft to be performed by the edger stand during each of predetermined flat passes to produce the desired slab width at the end of the schedule within mill opearting constraints.

25. A slabbing mill operating system as set forth in claim 24 wherein said programming system schedules at least one turnup edge pass after a predetermined number of flat passes to produce an amount of edge reduction which enables the desired slab width to be produced by flat pass edge work without requiring extension of the flat pass schedule beyond a predetermined number of passes.

26. A slabbing mill operating system as set forth in claim 24 wherein said programming system determines the edge drafting by minimizing the number of flat passes during which edge work is scheduled to reach desired slab width.

27. A slabbing mill operating system as set forth in claim 24 wherein said sensing means senses data including main mill roll force and main mill motor means armature current and armature voltage and edger motor armature current and armature voltage and edger position, and said programming system modifies the workpiece reduction schedule by a correction determination derived from the edger and main mill data.

28. A system for operating a slabbing mill having a main mill rolling stand with mill motor means for driving the stand work rolls and screwdown motor means for setting the unloaded opening between the work rolls and further having an edger stand with edger motor means for driving the edger rolls and edger position motor means for setting the opening between the edger rolls, said system comprising means for controlling the stand speed in accordance with a workpiece schedule, means for controlling the screwdown motor means to set the unloaded roll opening for each workpiece pass, means for turning a workpiece between edge and flat or flat and edge positions, means for controlling the edger motor speed and edger roll position, a programmed digital computer system coupled at its output to operate said controlling means in accordance with the workpiece schedule, a programming system for operating said computer system, said programming system determining a workpiece reduction schedule including a schedule of workpiece flat and edge passes during which flat drafts and edge drafts are to be made on at least one workpiece to reduce the workpiece from ingot size to desired slab size within mill operating constraints, determining as a part of the workpiece schedule the mill setup including the unloaded work roll opening and the edger position required during each pass to produce the scheduled flat and edge drafts, said workpiece reduction schedule including an edge scale breaking schedule of a limited number of edge passes needed to reduce the workpiece width to desired slab width plus at least a predetermined minimum amount within mill constraints, a flat pass schedule of successive flat drafts needed to reduce the workpiece height to the desired slab height within mill operating constraints, and a schedule of successive edge drafts to be performed by the edger stand during each of predetermined flat passes so that the desired slab width is produced at the end of the schedule within mill operating constraints.

References Cited

UNITED STATES PATENTS

| | | | |
|---|---|---|---|
| 3,289,444 | 12/1966 | Takuma | 72—7 |
| 3,363,441 | 1/1968 | Smith | 72—8 |
| 3,468,145 | 9/1969 | Yeomans | 72—12 |

OTHER REFERENCES

Iron and Steel Engineer, "Combination Slab and Plate Mill Rolls Under Computer Control," vol. 42, pp. 134–141.

MILTON S. MEHR, Primary Examiner

U.S. Cl. X.R.

72—11, 16, 19, 22